(12) United States Patent
Asanuma

(10) Patent No.: US 8,957,947 B2
(45) Date of Patent: Feb. 17, 2015

(54) IMAGE PROCESSING APPARATUS AND CONTROL METHOD THEREOF

(75) Inventor: Tomoya Asanuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 560 days.

(21) Appl. No.: 13/150,390

(22) Filed: Jun. 1, 2011

(65) Prior Publication Data

US 2012/0002013 A1    Jan. 5, 2012

(30) Foreign Application Priority Data

Jul. 2, 2010  (JP) .................................. 2010-152071
Apr. 20, 2011  (JP) ................................. 2011-094374

(51) Int. Cl.
*H04N 13/02* (2006.01)
*H04N 21/218* (2011.01)
*H04N 21/472* (2011.01)
*H04N 21/6587* (2011.01)

(52) U.S. Cl.
CPC ....... *H04N 21/21805* (2013.01); *H04N 21/472* (2013.01); *H04N 21/6587* (2013.01)
USPC ........................................................ 348/46

(58) Field of Classification Search
USPC ........................................................ 348/46
See application file for complete search history.

(56) References Cited

U.S. PATENT DOCUMENTS

2005/0273830 A1* 12/2005 Silver et al. .................. 725/105
2007/0146484 A1*  6/2007 Horton et al. ................ 348/159
2009/0079733 A1*  3/2009 Fukushima et al. .......... 345/419
2009/0115895 A1*  5/2009 Wang et al. .................. 348/468

FOREIGN PATENT DOCUMENTS

JP        2007-150747        6/2007

* cited by examiner

*Primary Examiner* — Tung Vo
*Assistant Examiner* — Obafemi Sosanya
(74) *Attorney, Agent, or Firm* — Cowan, Liebowitz & Latman, P.C.

(57) ABSTRACT

There is provided a video processing apparatus comprising: a video data obtainment unit configured to obtain arbitrary viewpoint video data having an arbitrary viewpoint specified by a user, the arbitrary viewpoint video data being generated based on a plurality of video data having different viewpoints; an output unit configured to output the arbitrary viewpoint video data obtained by the video data obtainment unit to a display unit; and a notification unit configured to notify the user based on a degree of matching between first viewpoint information corresponding to the plurality of video data having different viewpoints and second viewpoint information corresponding to the arbitrary viewpoint video data.

12 Claims, 13 Drawing Sheets

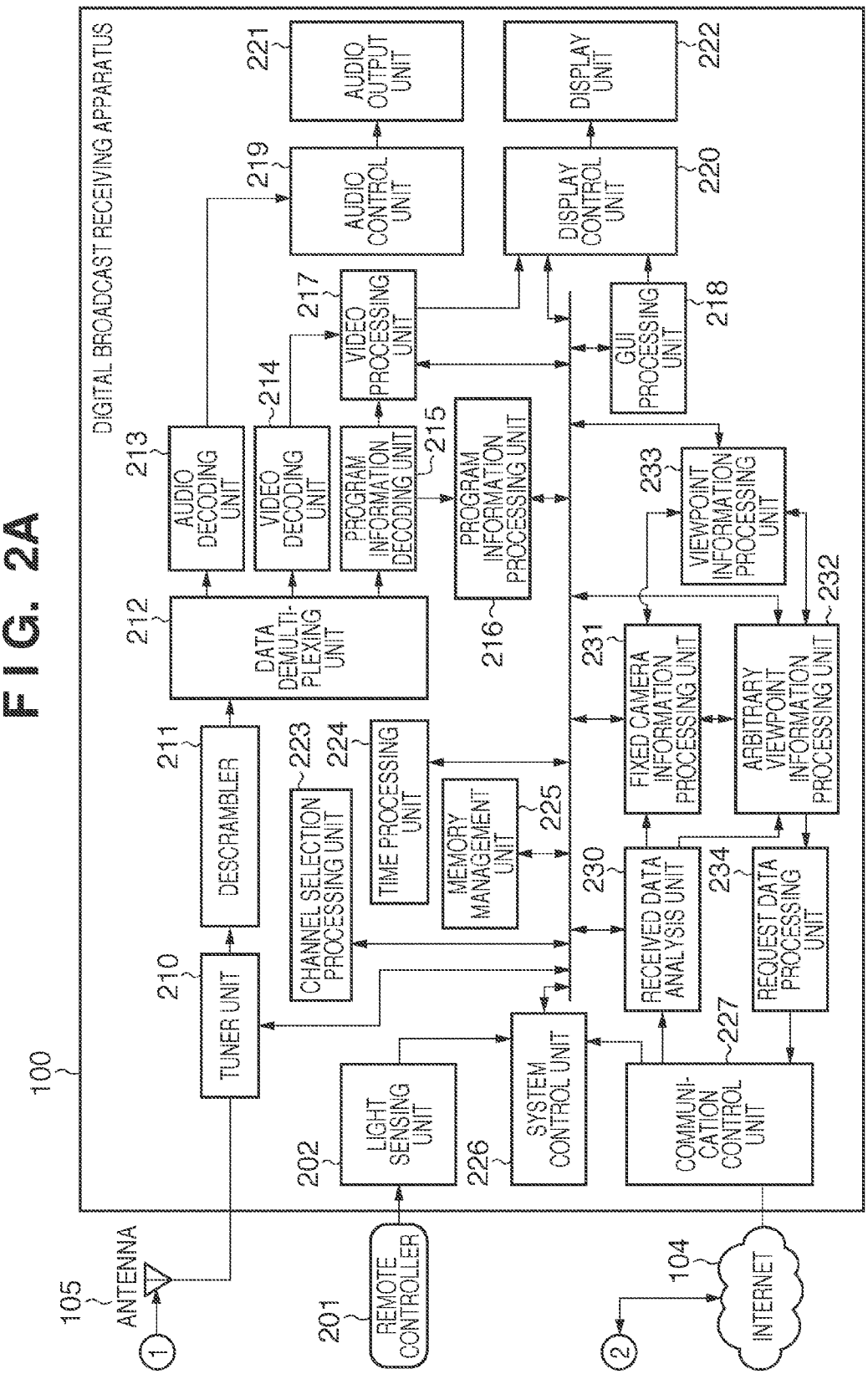

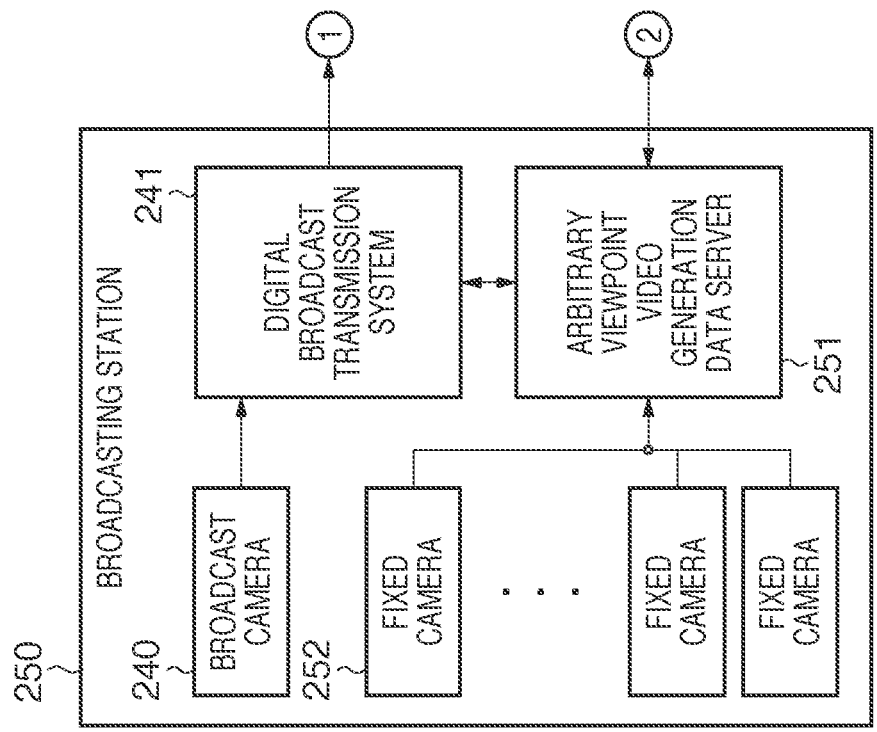

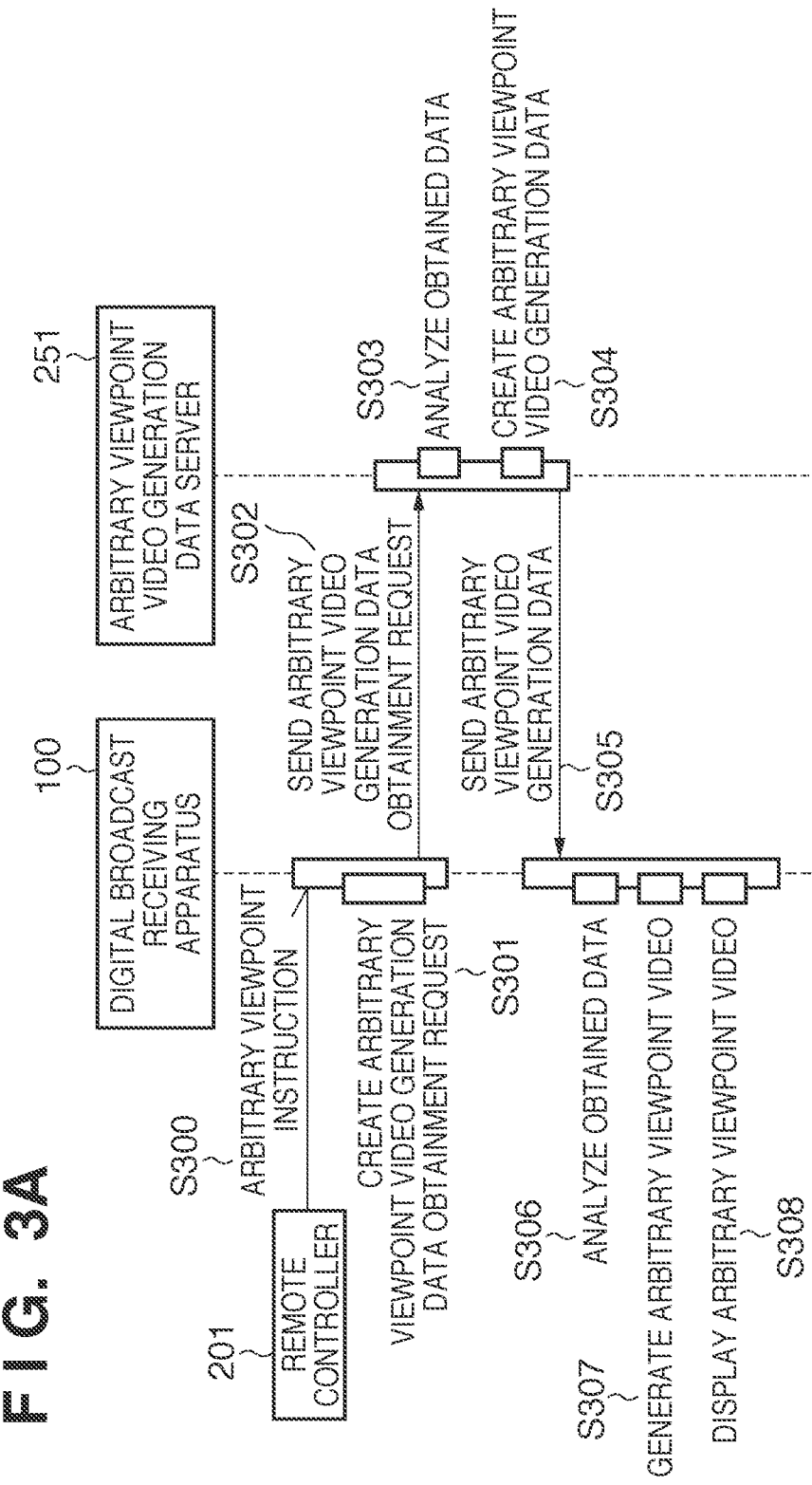

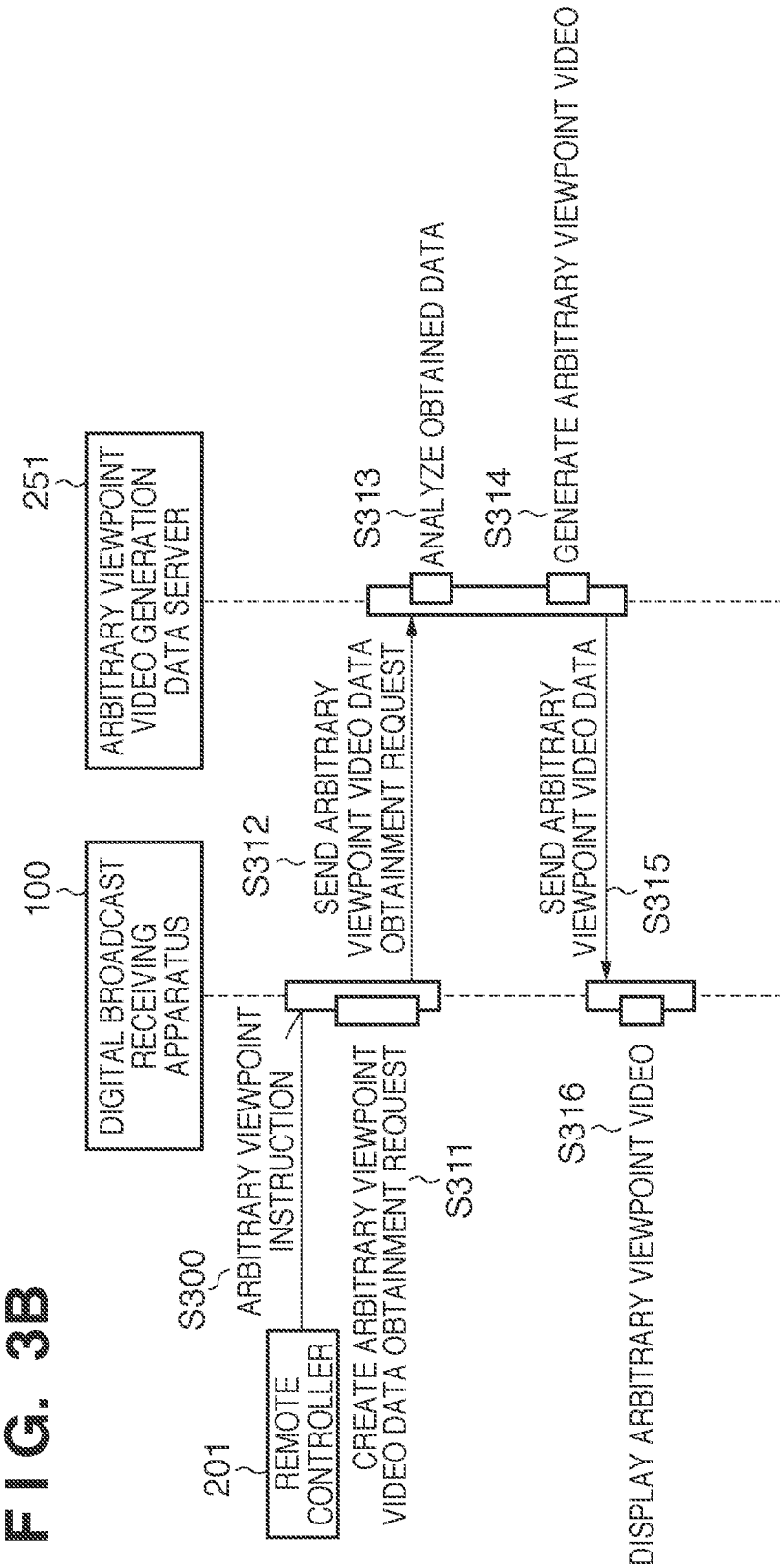

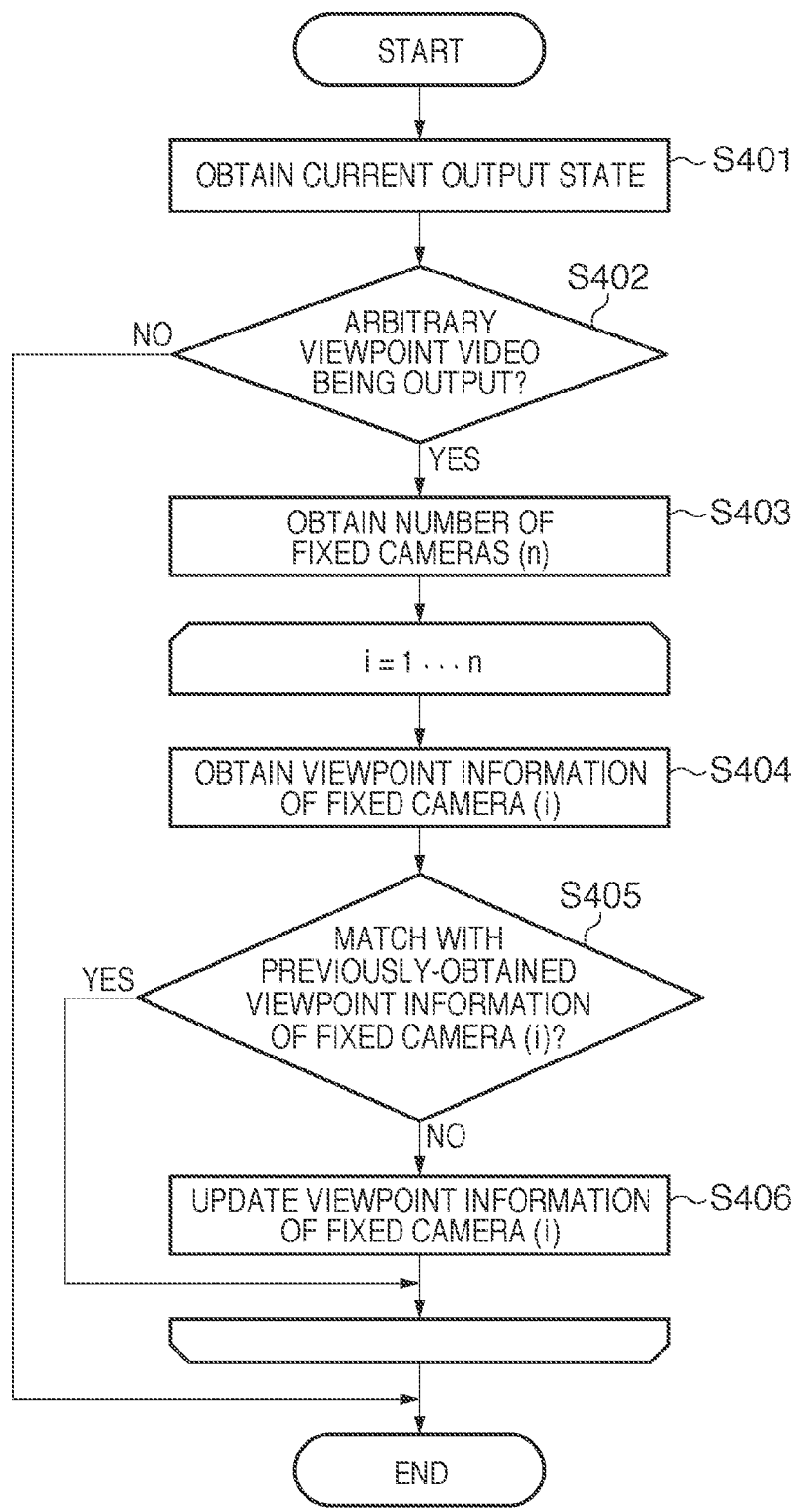

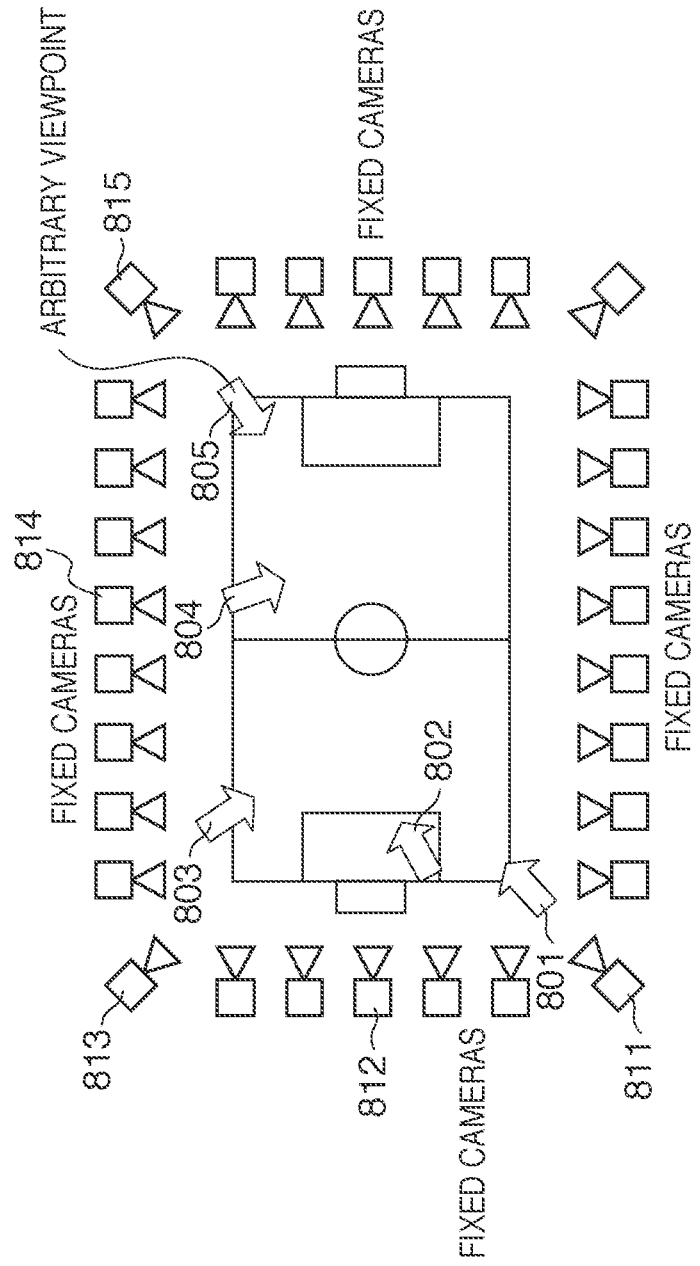

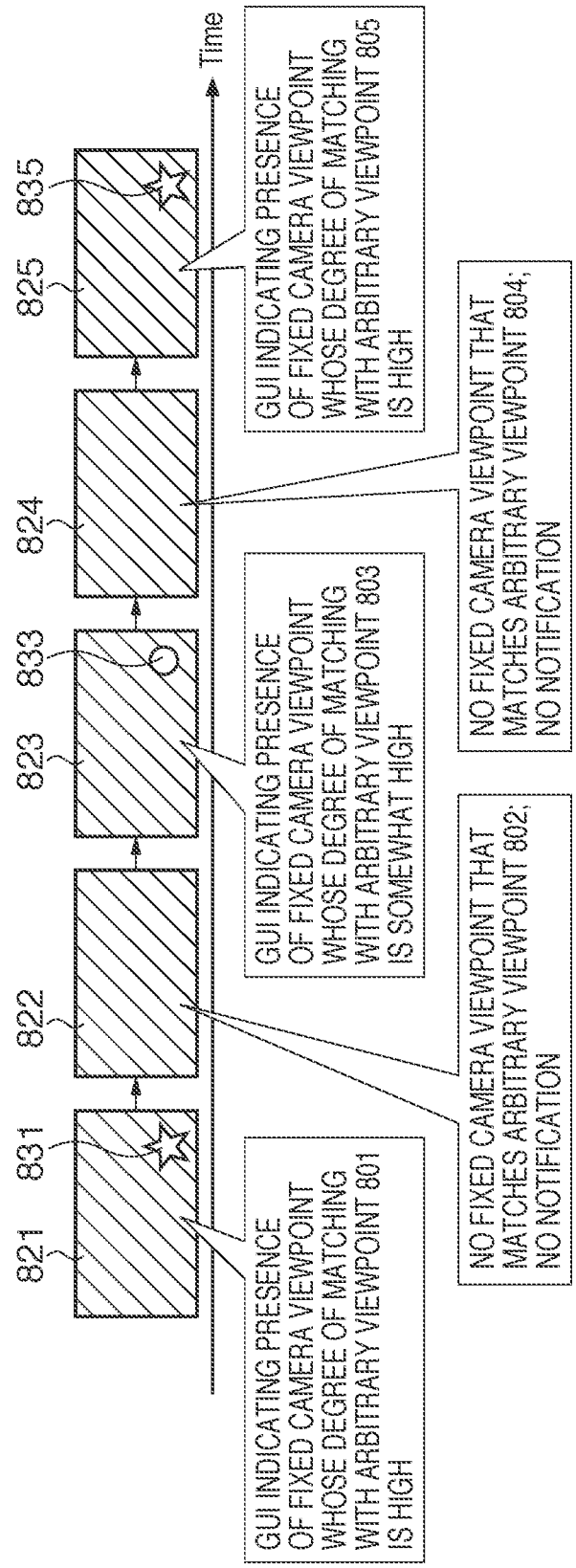

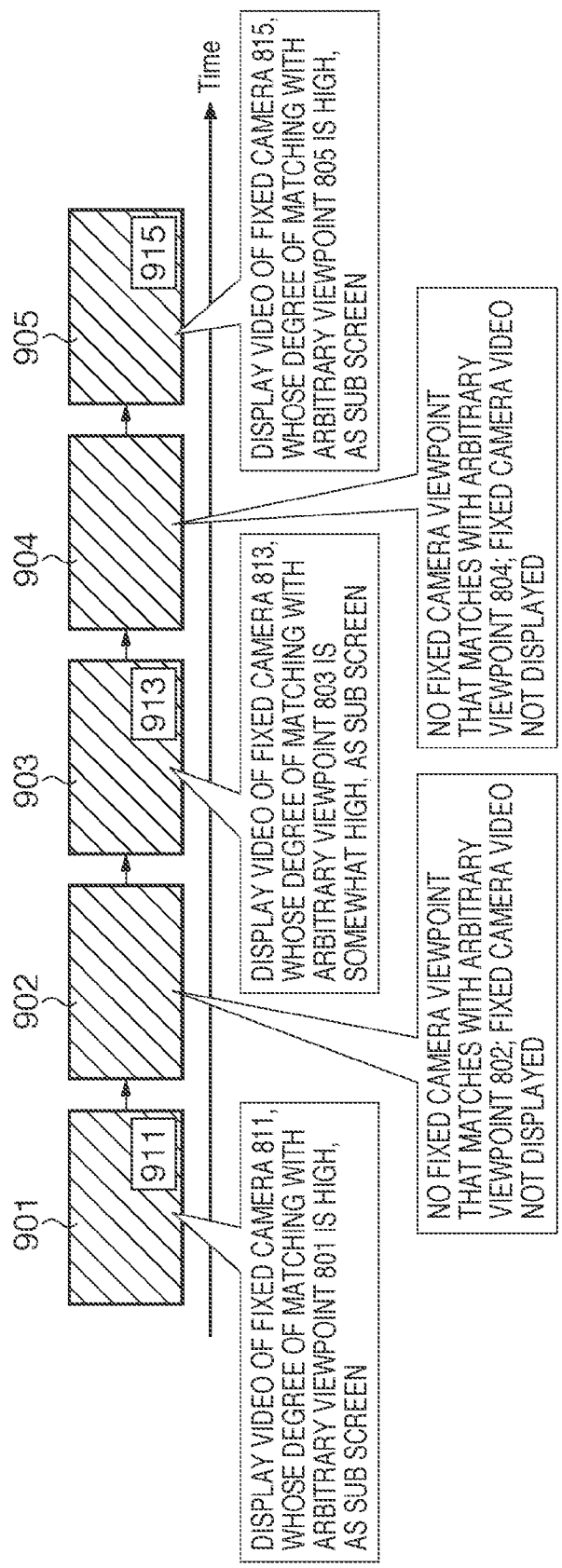

IMAGE PROCESSING APPARATUS AND CONTROL METHOD THEREOF

BACKGROUND OF THE INVENTION

1. Field of the Invention

The present invention relates to a video processing apparatus capable of reproducing arbitrary viewpoint video (free-viewpoint video) corresponding to a viewpoint from which a user wishes to view the video, as well as a control method for such an apparatus.

2. Description of the Related Art

With the start of digital broadcasting, televisions that are capable of receiving digital broadcasts (that is, digital televisions) are spreading. At present, the age of full-scale advent of the digital broadcasting is met, and extensive research and development into different types of next-generation broadcasting systems is being carried out. In particular, "arbitrary viewpoint video (free-viewpoint video)", in which a user (viewer) can freely specify the camera viewpoint, is gathering attention. Arbitrary viewpoint video corresponding to a camera viewpoint specified by a user is generated using video shot from multiple (a plurality of) viewpoints.

Japanese Patent Laid-Open No. 2007-150747 is known as a technique related to switching between the display of arbitrary viewpoint video and video actually shot by a camera (camera video). Japanese Patent Laid-Open No. 2007-150747 discloses a receiving apparatus that receives a broadcast stream containing broadcast video and viewpoint information for the broadcast video. When a request to distribute the arbitrary viewpoint video has been made, this receiving apparatus uses the viewpoint information of the broadcast video extracted from the broadcast stream as the initial value of the viewpoint of arbitrary viewpoint video.

Because arbitrary viewpoint video is generated by synthesizing video obtained by multiple cameras from different viewpoints, the image quality thereof is generally not as high as the image quality of video from the individual cameras used to generate the arbitrary viewpoint video. Accordingly, in the case where the video from the camera is video from the viewpoint requested by a user, it is thought that the user will feel a higher sense of satisfaction with the video from the camera than the arbitrary viewpoint video, in terms of the image quality. However, a user that is viewing arbitrary viewpoint video cannot know if there is video from a camera that has a viewpoint close to the viewpoint requested by the user. Although the technique disclosed in Japanese Patent Laid-Open No. 2007-150747 does discuss switching from a broadcast video (video from a camera) to arbitrary viewpoint video, it is not possible to recognize the relationship between a viewpoint requested by a user and the viewpoint of the video from the camera while the user is viewing the arbitrary viewpoint video.

SUMMARY OF THE INVENTION

Having been achieved in light of the aforementioned circumstances, the present invention provides a technique for notifying a user of the presence of camera video from a viewpoint that is close to the viewpoint of arbitrary viewpoint video that the user is currently viewing.

According to an aspect of the present invention, there is provided a video processing apparatus comprising: a video data obtainment unit configured to obtain arbitrary viewpoint video data having an arbitrary viewpoint specified by a user, the arbitrary viewpoint video data being generated based on a plurality of video data having different viewpoints; an output unit configured to output the arbitrary viewpoint video data obtained by the video data obtainment unit to a display unit; and a notification unit configured to notify the user based on a degree of matching between a plurality of first viewpoint information corresponding to the plurality of video data having different viewpoints and second viewpoint information corresponding to the arbitrary viewpoint video data.

According to another aspect of the present invention, there is provided a control method for a video processing apparatus, the method comprising: a video data obtainment step of obtaining arbitrary viewpoint video data having an arbitrary viewpoint specified by a user, the arbitrary viewpoint video data being generated based on a plurality of video data having different viewpoints; an output step of outputting the arbitrary viewpoint video data obtained in the video data obtainment step to a display unit; and a notification step of notifying the user based on a degree of matching between a plurality of first viewpoint information corresponding to the plurality of video data having different viewpoints and second viewpoint information corresponding to the arbitrary viewpoint video data.

According to the present invention configured as described above, it is possible to notify a user of the presence of camera video from a viewpoint that is close to the viewpoint of arbitrary viewpoint video that the user is currently viewing.

Further features of the present invention will become apparent from the following description of an exemplary embodiment with reference to the attached drawings.

BRIEF DESCRIPTION OF THE DRAWINGS

FIGS. 2A and 2B are block diagrams illustrating, in detail, the configuration of the digital broadcast receiving apparatus 100 and a broadcasting station 250.

FIG. 3A is a sequence chart illustrating an arbitrary viewpoint video reproduction process according to the first embodiment.

FIG. 3B is a sequence chart illustrating another example of an arbitrary viewpoint video reproduction process.

FIG. 4 is a flowchart illustrating a process for obtaining viewpoint information (shooting viewpoint information) expressing the viewpoints of the video from multiple fixed cameras 252 (that is, viewpoints toward a captured space).

FIGS. 8A and 8B are diagrams illustrating specific examples of a notification display GUI.

FIG. 9 is a diagram illustrating a specific example of a notification display GUI.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

First Embodiment

An embodiment in which a video processing apparatus according to the present invention is applied in a digital broadcast receiving apparatus will be described. The digital broadcast receiving apparatus according to the present embodiment is capable of receiving broadcast video contained in a digital broadcast wave (broadcast signal), and is also capable of obtaining, via the Internet, multiple pieces of video data obtained by multiple cameras (image pickup apparatuses) shooting a captured space from different viewpoints. In the present embodiment, "arbitrary viewpoint video (free-viewpoint video)" refers to virtual video of the captured space, viewed from an arbitrary viewpoint specified by a user, that is generated based on such multiple pieces of video. The arbitrary viewpoint video according to the present embodiment is assumed to be generated using the multiple pieces of video data obtained from the multiple cameras, but the multiple pieces of video data for generating the arbitrary viewpoint video may be animated video data, CG video data, or the like taken from multiple viewpoints.

Figure 1:
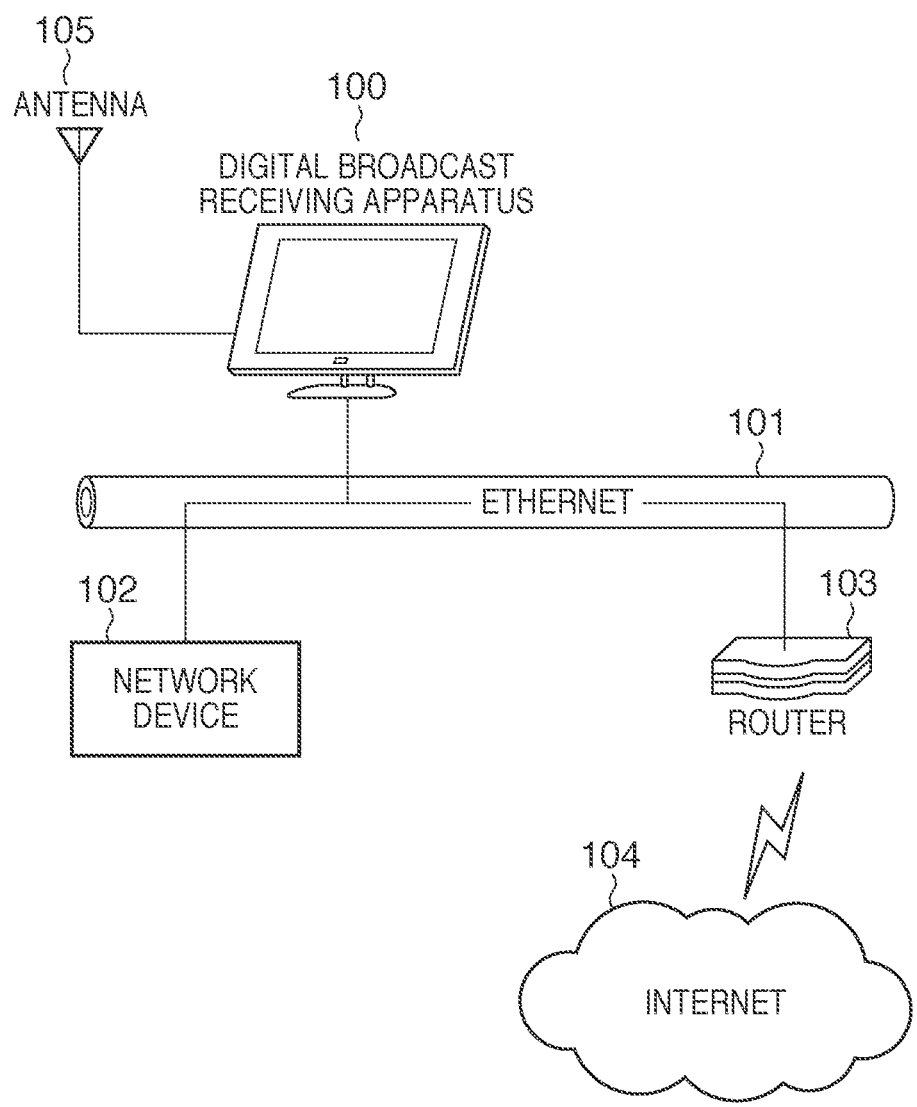
FIG. 1 is a diagram illustrating an example of the configuration of a system that includes a digital broadcast receiving apparatus 100 according to a first embodiment.

FIG. 1 is a diagram illustrating an example of the configuration of a system that includes a digital broadcast receiving apparatus 100 according to the first embodiment. The digital broadcast receiving apparatus 100 is capable of communication with a router 103, another network device 102, or the like via Ethernet® 101. The digital broadcast receiving apparatus 100 is connected to the Internet 104 via the router 103. Furthermore, the digital broadcast receiving apparatus 100 is capable of receiving a digital broadcast wave from an antenna 105 and reproducing a digital broadcast.

FIGS. 2A and 2B are block diagrams illustrating, in detail, the configuration of the digital broadcast receiving apparatus 100 and a broadcasting station 250. The digital broadcast receiving apparatus 100 is capable of receiving broadcast video broadcasted by the broadcasting station 250. First, the blocks related to the reception, reproduction, and so on of the broadcast video will be described.

As shown in FIGS. 2A and 2B, a signal received by the antenna 105 is input to a tuner unit 210. The tuner unit 210 generates transport stream data (TS). The tuner unit 210 outputs the TS, in which video data, audio data, program information data, and so on for multiple channels are multiplexed, to a data demultiplexing unit 212 via a descrambler 211. The data demultiplexing unit 212 acquires the audio data, video data, and program information data of a program selected using a remote controller 201 from the TS, and inputs those pieces of data into an audio decoding unit 213, a video decoding unit 214, and a program information decoding unit 215, respectively.

The video decoding unit 214 performs a decoding process according to a standard such as MPEG on the video data that has been input from the data demultiplexing unit 212, and outputs the decoded video data to a video processing unit 217. The audio decoding unit 213 performs a decoding process on the audio data that has been input from the data demultiplexing unit 212, and outputs the resulting signal to an audio control unit 219. The audio control unit 219 carries out a D/A (digital/analog) conversion process and the like on the audio data, and outputs the resulting signal to an audio output unit 221.

The program information decoding unit 215 obtains desired information from the program information data input from the data demultiplexing unit 212, and outputs that data to a program information processing unit 216, the video processing unit 217, and a GUI (Graphic User Interface) processing unit 218. The program information data includes SI (Service Information) data and PSI (Program-Specific Information) data.

The video processing unit 217 performs a video adjustment process based on the video data that has been input from the video decoding unit 214 and the program information that has been input from the program information decoding unit 215, and outputs the adjusted video data to a display control unit 220. The display control unit 220 performs actions such as switching, synthesizing, and so on on the video data, screen data, or the like input from the video processing unit 217 and the GUI processing unit 218, in response to operations made through the remote controller 201, and outputs the data to a display unit 222. A channel selection processing unit 223 carries out processing so that the audio data, video data, and program information data of a channel selected using the remote controller 201 can be received via the tuner unit 210. A time processing unit 224 counts time. Meanwhile, a memory management unit 225 manages a memory (not shown) that is present within the digital broadcast receiving apparatus 100.

A system control unit 226 includes a CPU, and performs the overall control of the various constituent elements by executing a program that is stored in a memory (not shown). The system control unit 226 also receives instructions from the remote controller 201 via a light sensing unit 202.

Next, the blocks related to the obtainment of arbitrary viewpoint video generation data and the reproduction of arbitrary viewpoint video will be described with reference to FIG. 3A in addition to FIGS. 2A and 2B. FIG. 3A is a sequence chart illustrating an arbitrary viewpoint video reproduction process according to the first embodiment. In FIG. 3A, the digital broadcast receiving apparatus 100 generates arbitrary viewpoint video. Prior to the processing illustrated in FIG. 3A, the digital broadcast receiving apparatus 100 connects to an arbitrary viewpoint video generation data server 251 of the broadcasting station 250 via the Internet 104. Note that the arbitrary viewpoint video generation data server 251 that generates the arbitrary viewpoint video generation data may be outside of the broadcasting station 250. The arbitrary viewpoint video is generated using multiple camera videos from different viewpoints. Here, "camera video" refers to video of a captured space expressed by the arbitrary viewpoint video, and is video actually shot by a camera (image pickup apparatus). The fixed cameras 252, a broadcast camera 240, and so on can be given as examples of cameras. Here, the fixed cameras 252 are cameras whose shooting position, shooting direction, and so on do not change during a predetermined period, whereas the broadcast camera 240 is assumed to be a camera whose shooting position or shooting direction changes during a predetermined period, such as a camcorder or the like. The arbitrary viewpoint video can be generated using video from the fixed cameras 252 and the broadcast camera 240. Furthermore, there may be multiple broadcast cameras 240. The video of broadcast programs transmitted by a digital broadcast transmission system 241 are generated from video shot by the broadcast camera 240. In the case where there are multiple broadcast cameras 240, the video of the broadcast program can be generated by switching between the video from the multiple broadcast cameras as appropriate. The cameras are not intended to be limited to those described above, and any cameras may be used as long as those cameras are capable of providing video data that expresses video of the same captured space as the generated arbitrary viewpoint video and that can be obtained (received) by the digital broadcast receiving apparatus 100. The present embodiment describes a case in which the arbitrary viewpoint video is generated using the multiple fixed cameras 252.

In step S300, an arbitrary viewpoint information processing unit 232 receives an arbitrary viewpoint video viewing request from a user via the remote controller 201. At this time, the arbitrary viewpoint information processing unit 232 receives, as the arbitrary viewpoint video viewing request, a channel name or a program name that the user wishes to view as well as the viewpoint information of the video the user wishes to view, as input by the user via the remote controller. When the user inputs the viewpoint information of the video he or she wishes to view, the digital broadcast receiving apparatus 100 receives, from the broadcasting station 250 and via the Internet or a broadcast wave, information regarding a coordinate space set for a captured space in the program that the viewer wishes to view. For example, the digital broadcast receiving apparatus 100 receives information that is related to a coordinate space arbitrarily set for the captured space in the video of a program and that is associated with the video of the program received by the digital broadcast receiving apparatus 100 based on the channel name or the program name that the user wishes to view as input by the user. Alternatively, the digital broadcast receiving apparatus 100 may request the arbitrary viewpoint video generation data server 251 to send the information regarding the coordinate space set arbitrarily for the captured space in the video of the program based on the channel name or the program name that the user wishes to view. Based on the information related to the coordinate space received in this manner, the GUI processing unit 218 creates a GUI representing the captured space, and the display control unit 220 displays the generated GUI in the display unit 222. The user then inputs the viewpoint information of the video he or she wishes to view by operating the remote control to use the GUI in order to specify a viewpoint in the coordinate space set for the captured space. The "viewpoint information" of video in the present invention includes at least information regarding the viewpoint location (coordinate location) and the viewpoint direction (pan/tilt angle) in the captured space. This information may further include angle of view information (that is, the size of the viewable video region that appears in the video), zoom factor information, and so on of the video. The arbitrary viewpoint information processing unit 232 internally stores the viewpoint information specified by the user. The method by which the user inputs the viewpoint information of the video he or she wishes to view is not limited to that described above; for example, the user may input a viewpoint in the coordinate space set for the captured space as a numerical value, or the user may select a single viewpoint from among multiple predetermined viewpoints sent from the arbitrary viewpoint video generation data server 251. Meanwhile, the system control unit 226 controls the display control unit 220 so that the GUI that represents the captured space is displayed in the display unit 222 in response to a request from the user to change the viewpoint. In step S301, the arbitrary viewpoint information processing unit 232 creates an arbitrary viewpoint video generation data obtainment request in order to obtain arbitrary viewpoint video generation data for generating the arbitrary viewpoint video from the viewpoint that the user wishes to view the video from. In step S302, the arbitrary viewpoint information processing unit 232 sends the created arbitrary viewpoint video generation data obtainment request to the arbitrary viewpoint video generation data server 251 of the broadcasting station 250 via a request data processing unit 234 and a communication control unit 227. Specifically, with respect to the sending of the arbitrary viewpoint video generation data obtainment request, the viewpoint information of the video the user wishes to view as input by the user through the remote controller is sent in a manner in which the arbitrary viewpoint video generation data server 251 can determine the video data needed to generate the arbitrary viewpoint video.

In step S303, the arbitrary viewpoint video generation data server 251 analyzes the arbitrary viewpoint video generation data obtainment request received from the digital broadcast receiving apparatus 100. In step S304, the arbitrary viewpoint video generation data server 251 obtains the video data from the multiple fixed cameras 252. The multiple fixed cameras 252 are deployed so as to capture the captured space (for example, a soccer stadium) from respective different viewpoints (for example, are deployed so as to surround the captured space). The arbitrary viewpoint video generation data server 251 creates the arbitrary viewpoint video generation data based on the obtained video data. In step S305, the arbitrary viewpoint video generation data server 251 sends the generated arbitrary viewpoint video generation data to the digital broadcast receiving apparatus 100.

Specifically, the "arbitrary viewpoint video generation data" is the pieces of video data needed to generate the arbitrary viewpoint video and information regarding the shooting position of each piece of video data, among the multiple pieces of video data obtained from the multiple fixed cameras 252. When creating arbitrary viewpoint video generation data, the video data obtained from the multiple fixed cameras 252 may be processed so as to make it easier to generate the arbitrary viewpoint video data. The arbitrary viewpoint video generation data is not limited to that described above; for example, all pieces of the video data obtained from the multiple fixed cameras 252 and the information regarding the shooting positions of each piece of the video data may be used as the arbitrary viewpoint video generation data.

In step S306, a received data analysis unit 230 analyzes the arbitrary viewpoint video generation data received via the communication control unit 227, and outputs the arbitrary viewpoint video generation data along with the results of the analysis to the arbitrary viewpoint information processing unit 232. In step S307, the arbitrary viewpoint information processing unit 232 (an arbitrary viewpoint video data obtainment unit) generates the arbitrary viewpoint video based on the input arbitrary viewpoint video generation data and the results of the analysis. In step S308, the arbitrary viewpoint information processing unit 232 outputs the arbitrary viewpoint video to the display control unit 220. The display control unit 220 synthesizes the input arbitrary viewpoint video with (if necessary) a GUI input from the GUI processing unit 218 and outputs the resulting video to the display unit 222. As a result, the arbitrary viewpoint video is displayed.

When the user inputs viewpoint information, the digital broadcast receiving apparatus 100 may receive, in advance, the video data from all of the multiple fixed cameras 252 that are shooting the captured space and the information regarding the shooting position of those pieces of video data, along with the information regarding the captured space in the video of the program. In this case, the request for and exchange of the arbitrary viewpoint video generation data, indicated by step S302 through step S305 in FIG. 3A, need not be carried out. The digital broadcast receiving apparatus 100 may receive only the information regarding the shooting positions of the multiple fixed cameras 252. In this case, the digital broadcast receiving apparatus 100 may determine the fixed cameras 252 that are needed to generate the arbitrary viewpoint video from the information regarding the shooting positions of the multiple fixed cameras 252, and send a request for the video data from those fixed cameras 252 in step S302. Although the digital broadcast receiving apparatus 100 generates the arbitrary viewpoint video in the process illustrated in FIG. 3A, the generation may be carried out at a different location. For example, FIG. 3B illustrates a case in which the arbitrary viewpoint video generation data server generates the arbitrary viewpoint video. In FIG. 3B, steps that perform processes identical or similar to those in FIG. 3A are given identical reference numerals, and descriptions thereof will be omitted.

In step S311, the arbitrary viewpoint information processing unit 232 creates a request for obtaining the arbitrary viewpoint video of a viewpoint that the user wishes to view the video from. In step S312, the arbitrary viewpoint information processing unit 232 sends the created arbitrary viewpoint video obtainment request to the arbitrary viewpoint video generation data server 251 of the broadcasting station 250 via the request data processing unit 234 and the communication control unit 227. The data sent at this time includes at least the viewpoint information of the video the user wishes to view, as input by the user through the remote controller.

In step S313, the arbitrary viewpoint video generation data server 251 analyzes the arbitrary viewpoint video data obtainment request received from the digital broadcast receiving apparatus 100. Then, in step S314, the arbitrary viewpoint video generation data server 251 obtains the video data from the multiple fixed cameras 252 and the information regarding the shooting positions of the video data, and generates the arbitrary viewpoint video data based on the obtained video data. In step S315, the arbitrary viewpoint video generation data server 251 sends the generated arbitrary viewpoint video data to the digital broadcast receiving apparatus 100. In step S316, the arbitrary viewpoint information processing unit 232 outputs the arbitrary viewpoint video data to the display control unit 220. The display control unit 220 synthesizes the input arbitrary viewpoint video data with (if necessary) a GUI input from the GUI processing unit 218 and outputs the resulting video to the display unit 222. As a result, the arbitrary viewpoint video is displayed.

By repeating the processes described above with reference to FIG. 3A or 3B, the digital broadcast receiving apparatus 100 can reproduce arbitrary viewpoint video of a viewpoint from which the user wishes to view the video. The processes illustrated in FIG. 3A or 3B are carried out at least each time the arbitrary viewpoint information processing unit 232 receives, through the remote controller, viewpoint information of video that the user wishes to view. For example, in step S300, the process is carried out when, while viewing the arbitrary viewpoint video, the user inputs, through the remote controller, a request to change the viewpoint from which he or she is viewing the video. Through this, even in the case where the user has changed the viewpoint from which he or she wishes to view the video, the arbitrary viewpoint video from the post-change viewpoint can be reproduced.

Next, a process for detecting camera video from a viewpoint that is close to the viewpoint of arbitrary viewpoint video that is currently being viewed (in other words, that is currently being output by the digital broadcast receiving apparatus 100) will be described.

First, a case in which video having a viewpoint that is close to the viewpoint of the arbitrary viewpoint video is detected from among the videos expressed by multiple pieces of video data obtained by the multiple fixed cameras 252 will be described with reference to FIGS. 4 through 9.

FIG. 4 is a flowchart illustrating a process for obtaining viewpoint information (shooting viewpoint information) expressing the viewpoints of the video from the multiple fixed cameras 252 (that is, viewpoints of the captured space). The processes in this flowchart are carried out periodically at predetermined intervals (for example, every one second) by the system control unit 226 controlling the various constituent elements.

In step S401, a fixed camera information processing unit 231 obtains the output state of the current video (that is, whether a digital broadcast video, arbitrary viewpoint video, video from an external source, or the like is being output) from the system control unit 226. In the case where the video being output to the display unit 222 by the display control unit 220 is a digital broadcast video received from a broadcast wave, the output state of the video is that the digital broadcast video is being output. In the case where the video being output is arbitrary viewpoint video generated by the arbitrary viewpoint information processing unit 232 or generated by the arbitrary viewpoint video generation data server 251 and received via the communication control unit 227, the output state of the video is that arbitrary viewpoint video is being output. In the case where the video is from an external device (not shown) connected to the digital broadcast receiving apparatus, the output state of the video is that video from an external source is being output. In step S402, the fixed camera information processing unit 231 determines whether or not the current output state is that "arbitrary viewpoint video is being output". In the case where "arbitrary viewpoint video is being output", the process advances to step S403, whereas if such is not the case, the process ends.

In step S403, the fixed camera information processing unit 231 obtains the number of fixed cameras 252 that generate camera video that can be received from the arbitrary viewpoint video generation data server 251 by the digital broadcast receiving apparatus 100. To be more specific, the fixed camera information processing unit 231 inquires with the arbitrary viewpoint video generation data server 251 as to the number of fixed cameras 252, via the request data processing unit 234 and the communication control unit 227. After this, the processes from step S404 to step S406 are repeated the same number of times as there are fixed cameras 252.

In step S404, the fixed camera information processing unit 231 (that is, a shooting viewpoint information obtainment unit) obtains the viewpoint information (first viewpoint information) of each of the fixed cameras 252 from the arbitrary viewpoint video generation data server 251 (in other words, obtains multiple pieces of the first viewpoint information). In step S405, in the case where there is saved viewpoint information that was previously obtained in step S404, the fixed camera information processing unit 231 compares the previous viewpoint information with the viewpoint information currently obtained in step S404, and determines whether or not the two pieces of information match. In the case where the pieces of information do not match, in step S406, the fixed camera information processing unit 231 updates the internally-saved previous viewpoint information to the currently-obtained viewpoint information.

The latest viewpoint information for each of the fixed cameras 252 is thus saved in the fixed camera information processing unit 231 through the process described above.

In FIG. 4, in the case where it is determined in step S402 that arbitrary viewpoint video is being output, the fixed camera information processing unit 231 obtains the viewpoint information of the fixed cameras 252 from the arbitrary viewpoint video generation data server 251. However, in the case where the viewpoint information of the fixed cameras 252 is obtained along with the arbitrary viewpoint video generation data from the arbitrary viewpoint video generation data server 251 when the arbitrary viewpoint information processing unit 232 generates the arbitrary viewpoint video, the fixed camera information processing unit 231 does not especially need to perform the process illustrated in FIG. 4. In other words, in the case where information regarding the shooting positions of the video data (that can be used as viewpoint information of the fixed cameras 252) is provided along with the video data of the fixed cameras 252 as the arbitrary viewpoint video generation data, as described with reference to FIG. 3A, the fixed camera information processing unit 231 can use the viewpoint information that is sent along with the video data from the fixed cameras 252.

Figure 5:
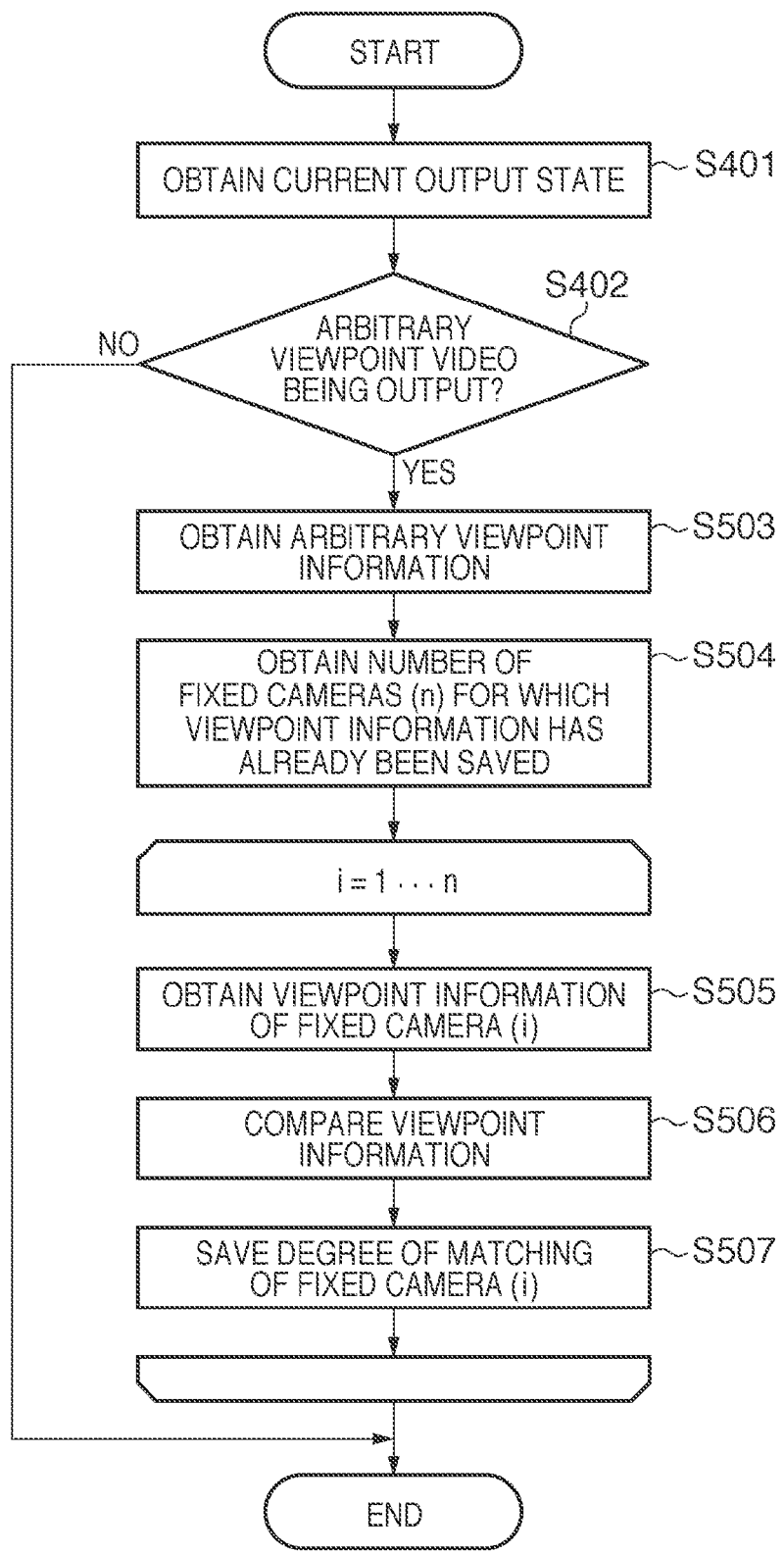
FIG. 5 is a flowchart illustrating a process for obtaining a degree of matching between the viewpoint of arbitrary viewpoint video and the viewpoint of camera video.

Next, a process for obtaining a degree of matching between the viewpoint in the arbitrary viewpoint video and the viewpoint in camera video (that is, the degree to which the two viewpoints match) will be described with reference to FIG. 5. The degree of matching in the present embodiment is a higher value the more the viewpoint of the arbitrary viewpoint video and the viewpoint of the camera video resemble each other. The process illustrated in FIG. 5 is executed in the case where the arbitrary viewpoint information processing unit 232 has received, via the remote controller, the viewpoint information of video the user wishes to view, as indicated in step S300 of FIG. 3A or FIG. 3B, and in the case where the viewpoint information of the fixed cameras 252 has been updated, as indicated in step S406 of FIG. 4. In FIG. 5, steps that perform processes identical or similar to those in FIG. 4 are given identical reference numerals, and descriptions thereof will be omitted. As in FIG. 4, the processes in the flowchart shown in FIG. 5 are executed by the system control unit 226 controlling the various constituent elements.

In step S503, a viewpoint information processing unit 233 (an arbitrary viewpoint information obtainment unit) obtains, from the arbitrary viewpoint information processing unit 232, viewpoint information (arbitrary viewpoint information) (second viewpoint information) expressing a viewpoint in the arbitrary viewpoint video (that is, a viewpoint on the captured space). In step S504, the viewpoint information processing unit 233 obtains, from the fixed camera information processing unit 231, the number of fixed cameras 252 (for which the viewpoint information of the video data has already been saved in step S406 of FIG. 4). After this, the processes from step S505 to step S507 are repeated the same number of times as there are fixed cameras 252.

In step S505, the viewpoint information processing unit 233 obtains the viewpoint information of each of the fixed cameras 252 from the fixed camera information processing unit 231. In step S506, the viewpoint information processing unit 233 compares each of the viewpoints in the viewpoint information of each of the fixed cameras 252 with the viewpoint of the arbitrary viewpoint information, and calculates the degree of matching therebetween. In step S507, the viewpoint information processing unit 233 saves the degree of matching calculated in step S506 for each of the fixed cameras 252. Alternatively, instead of saving the degree of matching for all of the fixed cameras 252, the viewpoint information processing unit 233 may save the highest degree of matching between the viewpoint of the arbitrary viewpoint video and the viewpoints of each of the camera video along with information indicating the fixed camera 252 that corresponds to that highest degree of matching.

It should be noted that while the degree of matching between the viewpoints can be calculated by, for example, comparing the arbitrary viewpoint information with the viewpoint information of the camera video (that is, the camera positions, pan/tilt angles, zoom information, angle of view information, and so on), comparing the arbitrary viewpoint video with pictures from the camera video, and so on, the calculation is not intended to be limited thereto. Furthermore, although a configuration that uses the viewpoint information of the fixed cameras 252 as the viewpoint information of the camera video is described, the viewpoint information of the broadcast camera 240 may be obtained from the arbitrary viewpoint video generation data server 251, and the viewpoint information of the broadcast camera 240 may be included as viewpoint information of the camera video.

Figure 6:
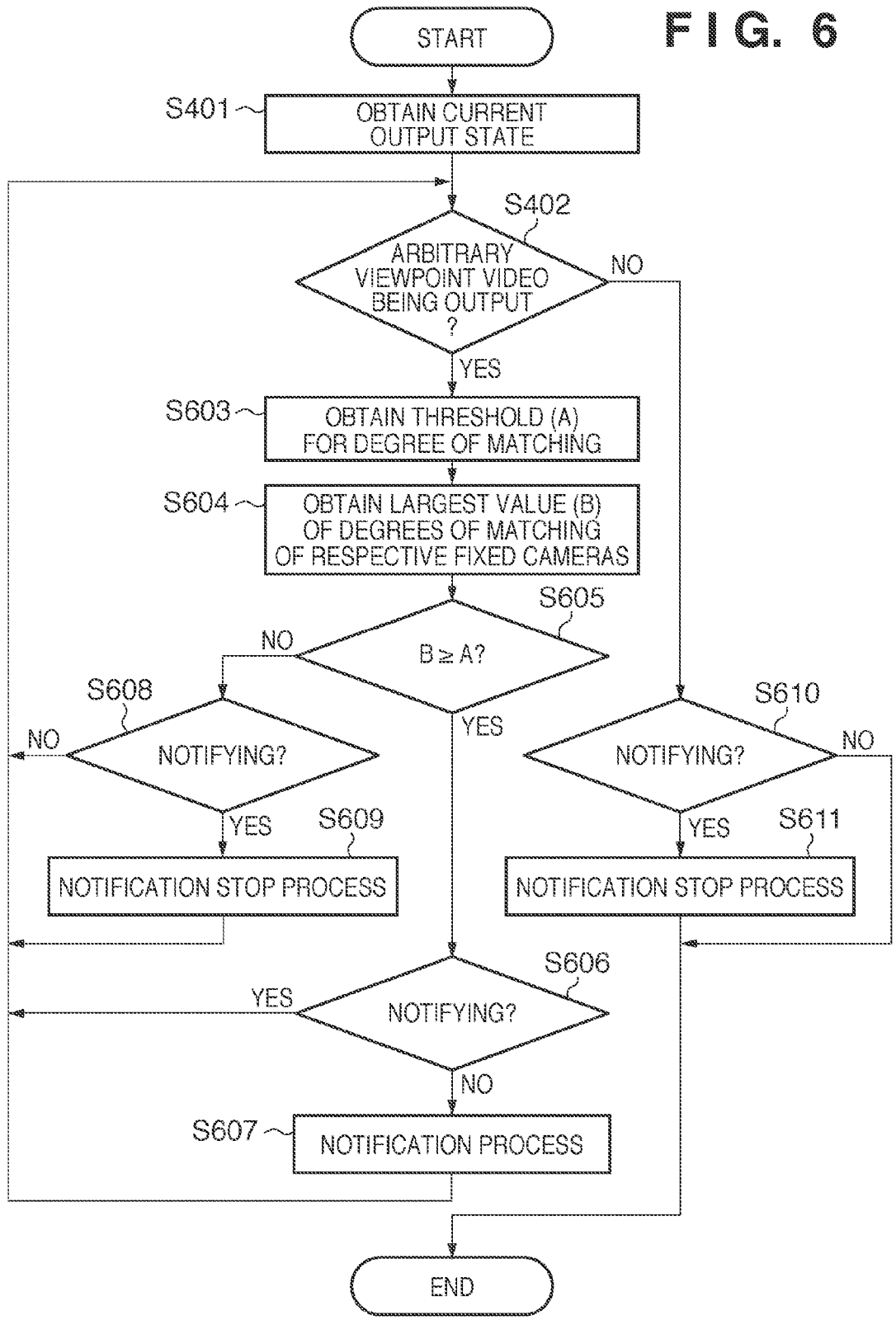
FIG. 6 is a flowchart illustrating a process for notifying a user of the presence of camera video that has a viewpoint that is close to the viewpoint of arbitrary viewpoint video.

Next, a process for notifying the user of the presence of camera video from a viewpoint that is close to the viewpoint of the arbitrary viewpoint video that the user is currently viewing will be described with reference to FIG. 6. The processes in this flowchart are executed, for example, following the processes illustrated in FIG. 5. As in FIG. 4, the processes in the flowchart shown in FIG. 6 are executed by the system control unit 226 controlling the various constituent elements. In FIG. 6, steps that perform processes identical or similar to those in FIG. 4 are given identical reference numerals, and descriptions thereof will be omitted. However, in the case where a determination of "NO" has been made in step S402, the process advances to step S610.

In step S603, the viewpoint information processing unit 233 obtains a threshold A for the degree of matching between viewpoints (from, for example, a memory (not shown)). Then, in step S604, the viewpoint information processing unit 233 obtains a largest value B of the degrees of matching of the viewpoints of the fixed cameras 252 saved in step S507 of FIG. 5. In step S605, the viewpoint information processing unit 233 determines whether or not (the largest value B of the degrees of matching of the viewpoints)≥(the threshold A), or in other words, whether or not the largest value is greater than or equal to the threshold. If the largest value B is greater than or equal to the threshold A, the process advances to step S606, whereas if the largest value B is less than the threshold A, the process advances to step S608.

In step S606, the viewpoint information processing unit 233 determines whether or not the user is being notified of the presence of video from a fixed camera 252 whose degree of matching has been determined to be greater than or equal to the threshold in step S605 and is thus taken as camera video of a viewpoint that is close to the viewpoint of the arbitrary viewpoint video currently being viewed. If the user is not being notified of the presence of camera video of a viewpoint that is close to the viewpoint of the arbitrary viewpoint video, or if a notification is currently being carried out for a fixed camera that is different from the fixed camera determined in step S605 to have a degree of matching greater than or equal to the threshold, the process advances to step S607, whereas if the notification is currently being carried out, the process returns to step S402. In step S607, the viewpoint information processing unit 233 carries out a process for notifying the user of the presence of video from a fixed camera having a degree of matching determined to be greater than or equal to the threshold in step S605 (details will be given later with reference to FIGS. 8A, 8B, and 9).

In step S608, the viewpoint information processing unit 233 determines whether or not the user is being notified of the presence of camera video of a viewpoint that is close to the viewpoint of the arbitrary viewpoint video currently being viewed. If the user is being notified, the process advances to step S609, whereas if the user is not being notified, the process returns to step S402. In step S609, the viewpoint information processing unit 233 carries out a process for stopping the notification.

In step S610, the viewpoint information processing unit 233 determines whether or not the user is being notified of the presence of camera video of a viewpoint that is close to the viewpoint of the arbitrary viewpoint video currently being viewed. If the user is being notified, the process advances to step S611, whereas if the user is not being notified, the process of the flowchart ends. In step S611, the viewpoint information processing unit 233 carries out a process for stopping the notification.

Through the processing described thus far, the viewpoint information processing unit 233 detects camera video of a viewpoint that is close to the viewpoint of the arbitrary viewpoint video currently being viewed, and notifies the user of the presence of that camera video. Furthermore, the process switches between notifying the user and not notifying the user.

Figure 7:
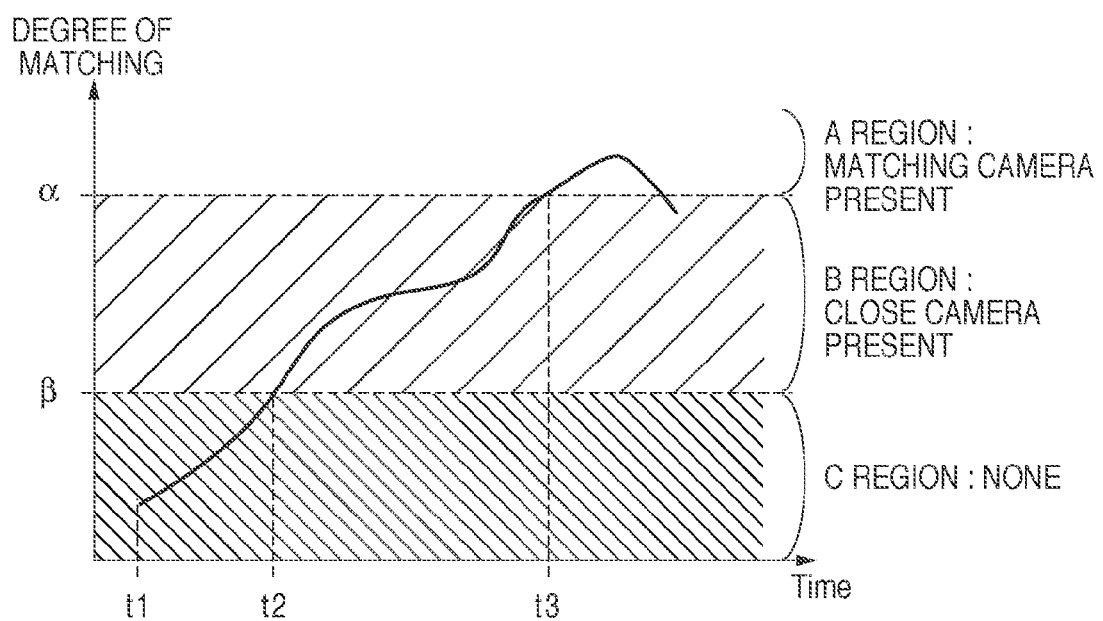
FIG. 7 is a conceptual diagram illustrating a case in which multiple thresholds are used as thresholds for a degree of matching.

Incidentally, although only a single threshold is used in step S603 and step S605, multiple thresholds (for example, α and β) may be used. FIG. 7 is a conceptual diagram illustrating a case in which multiple thresholds are used as thresholds for the degree of matching. The horizontal axis represents time, whereas the vertical axis represents the largest value B of the degree of matching obtained in step S604 for each time.

At the point in time when the user begins viewing the arbitrary viewpoint video (a time t1), the degree of matching is less than the threshold β. Therefore, camera video of a viewpoint that is close to the viewpoint of the arbitrary viewpoint video that the user is currently viewing is not present, and thus the notification is not carried out (that is, a determination of "NO" is made in step S605 of FIG. 6). After this, the viewpoint of the arbitrary viewpoint video moves in response to an instruction made by the user, and at a time t2, the degree of matching reaches the threshold β. For this reason, a determination of "YES" is made in step S605 of FIG. 6, and the viewpoint information processing unit 233 notifies the user of the presence of camera video of a viewpoint that is close to the viewpoint of the arbitrary viewpoint video that the user is currently viewing. Then, the viewpoint of the arbitrary viewpoint video moves further, and at a time t3, the degree of matching reaches the threshold α (>β). Although a determination of "YES" is made in step S605 of FIG. 6 in this case as well, the form of the notification is different. In other words, the viewpoint information processing unit 233 notifies the user of the presence of camera video of a viewpoint that almost matches the viewpoint of the arbitrary viewpoint video that the user is currently viewing.

Note that the thresholds (A, α, β) may be stored as data that cannot be changed by the digital broadcast receiving apparatus 100, or may be stored as data that can be changed by the user.

Next, the notification process will be described in detail. The viewpoint information processing unit 233 instructs the GUI processing unit 218 to generate a notification display GUI. The notification display GUI is input into the display control unit 220. The display control unit 220 superimposes the notification display GUI on video input from the video processing unit 217, and outputs the resulting video to the display unit 222.

FIGS. 8A, 8B, and 9 are diagrams illustrating specific examples of the notification display GUI. In FIGS. 8A and 8B, the viewpoint information processing unit 233 carries out the notification by displaying a GUI based on the determination of the degree of matching of the viewpoints carried out in step S605 of FIG. 6. In FIG. 8A, icons 801 through 805 indicate arbitrary viewpoints (positions and directions) specified by the user. The viewpoints of fixed cameras in the captured space are expressed as icons, as indicated by fixed cameras 811 through 815. Only the icon of the viewpoint corresponding to the arbitrary viewpoint video that is currently being displayed is displayed. In FIG. 8B, arbitrary viewpoint videos 821 through 825 indicate the display screens for video from the viewpoints indicated by the icons 801 through 805. Although the present embodiment describes a case in which the viewpoints corresponding to the icons 801 through 805 are specified sequentially, one at a time, it should be noted that multiple viewpoints may be specified. In such a case, multiple pieces of video data may be displayed on the screen. In FIG. 8A, in the case where the viewpoint of the arbitrary viewpoint video is the icon 801, the degree of matching between the viewpoint of the icon 801 and the viewpoint of the fixed camera 811 is high (that is, greater than or equal to the threshold α). Accordingly, the viewpoint information processing unit 233 displays a GUI indicating the presence of camera video of a viewpoint that almost matches the viewpoint of the arbitrary viewpoint video, along with the arbitrary viewpoint video 821 that the user is currently viewing. The GUI displayed at this time may display the position of the camera whose viewpoint almost matches the viewpoint of the arbitrary viewpoint video that the user is currently viewing, or may simply display whether or not camera video whose viewpoint almost matches the viewpoint of the arbitrary viewpoint video that the user is currently viewing is present. Specifically, as shown in FIG. 8A, the viewpoint information of the fixed camera and the viewpoint information of the arbitrary viewpoint video within the captured space are laid out and displayed, and the display of the fixed camera whose viewpoint almost matches the viewpoint of the arbitrary viewpoint video that the user is currently viewing is changed (for example, the color of the icon of the fixed camera 811 that is close to the viewpoint of the icon 801 is set to a different color than the icons of the other cameras). In this case, the GUI illustrated in FIG. 8A may be displayed using the entire screen of the display unit 222, or maybe synthesized and displayed as a sub screen in part of the arbitrary viewpoint video. In the case where the GUI is displayed using the entire screen, the display is switched to the arbitrary viewpoint video after the passage of a predetermined amount of time. Alternatively, as shown in FIG. 8B, an icon (an icon 831) that notifies the user of the presence of the camera (the fixed camera 811) whose viewpoint almost matches the viewpoint of the arbitrary viewpoint video that the user is currently viewing (the icon 801) maybe synthesized with and displayed as part of the arbitrary viewpoint video while the arbitrary viewpoint video of the viewpoint that the user wishes to view (that is, and arbitrary viewpoint video 821) is being displayed. For example, in the case where the fixed camera 813, whose degree of matching with the viewpoint of the icon 803 is greater than or equal to β but less than α, is present, the viewpoint information processing unit 233 displays a GUI (an icon 833) that indicates the presence of camera video of a viewpoint that is close to the viewpoint of the arbitrary viewpoint video that the user is currently viewing. The GUI displayed when the degree of matching is greater than or equal to the threshold α and the GUI that is displayed when the degree of matching is greater than or equal to β but less than α may be displayed so as to be distinguishable from each other, based on the degree of matching between the viewpoint specified by the user and the viewpoint of the camera video. For example, the color of the icons for the fixed cameras 811 and 815 may be set to a different color than the icon of the fixed camera 813 in FIG. 8A, whereas the colors, shapes, or the like of the icons 831 and 835 in the icon 833 may be set to different colors, shapes, or the like in FIG. 8B. Furthermore, in the case of a viewpoint icon 802 for the arbitrary viewpoint video, only a fixed camera whose degree of matching for the viewpoint is less than β is present (for example, the fixed camera 812). In this case, the viewpoint information processing unit 233 does not carry out a notification. Alternatively, a notification indicating that camera video having a high degree of matching with the viewpoint is not present may be carried out.

Alternatively, instead of the display shown in FIG. 8B, a display such as that shown in FIG. 9 can be carried out. In the example shown in FIG. 9, the viewpoint information processing unit 233 carries out the notification by displaying camera video of a viewpoint that is close to the viewpoint of the arbitrary viewpoint video that the user is currently viewing as a sub screen. Arbitrary viewpoint videos 901 through 905 in FIG. 9 indicate display screens for video corresponding to the viewpoints indicated by the icons 801 through 805 in FIG. 8A, as with the arbitrary viewpoint videos 821 through 825 in FIG. 8B. In FIG. 9, in the case where the viewpoints of the arbitrary viewpoint videos are indicated by the icons 801, 803, and 805, the videos from the fixed cameras 811, 813, and 815 shown in FIG. 8A, whose respective degrees of matching with the viewpoints of the arbitrary viewpoint video are high, are displayed as sub screens. In the case where the digital broadcast receiving apparatus 100 generates the arbitrary viewpoint video and the arbitrary viewpoint video generation data includes the video of a fixed camera determined in step S605 of FIG. 6 to have a degree of matching that is greater than or equal to the threshold, the arbitrary viewpoint information processing unit 232 outputs the video of that fixed camera. Then, the display control unit 220 synthesizes the arbitrary viewpoint video with the video from the fixed camera whose degree of matching with the viewpoint is greater than or equal to the threshold, and outputs the resulting video. In the case where the arbitrary viewpoint information processing unit 232 does not hold the video of a fixed camera whose degree of matching has been determined in step S605 to be greater than or equal to the threshold, that video is acquired from the arbitrary viewpoint video generation data server 251. As another notification method, sub screens 911 and 915 that display videos of the fixed cameras 811 and 815, respectively, whose degrees of matching with the viewpoint are high, may be displayed at a larger size than a sub screen 913 that displays video of the fixed camera 813, whose degree of matching with the viewpoint is somewhat high, thus notifying the user that the degrees of matching with the viewpoint of the fixed cameras 811 and 815 are greater than the degree of matching with the viewpoint of the fixed camera 813.

As described thus far, according to the present embodiment, the digital broadcast receiving apparatus 100 obtains the viewpoint information of the respective fixed cameras 252 (FIG. 4), and calculates the degrees of matching between the viewpoint information of the respective fixed cameras 252 and the viewpoint information of the arbitrary viewpoint video (FIG. 5). Then, the digital broadcast receiving apparatus 100 determines whether or not the largest value of the calculated degree of matching is greater than or equal to the threshold, and notifies the user if the largest value is greater than or equal to the threshold (FIG. 6). Through this, it is possible to notify the user of the presence of camera video of a viewpoint that is close to the viewpoint of arbitrary viewpoint video that the user is currently viewing.

(Variation 1)

Figure 10:
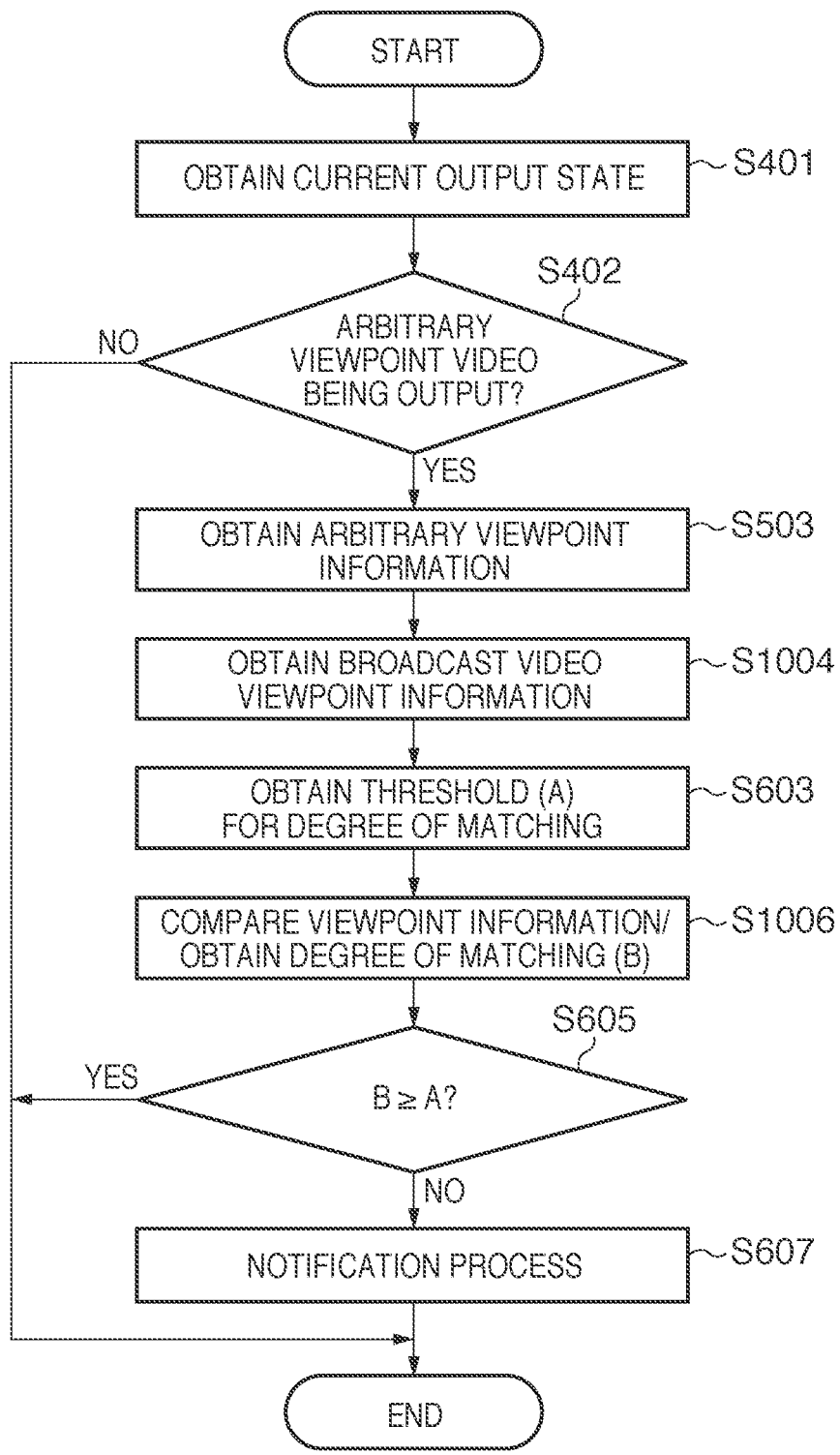
FIG. 10 is a flowchart illustrating a process for notifying a user of the presence of camera video that has a viewpoint that is close to the viewpoint of arbitrary viewpoint video, according to a first variation.

As described earlier, the camera video may be a broadcast video. In this case, the processes illustrated in FIG. 5 and FIG. 6 are replaced with the process illustrated in FIG. 10. In FIG. 10, steps that perform processes identical or similar to those in FIG. 4, FIG. 5, or FIG. 6 are given identical reference numerals, and descriptions thereof will be omitted. As in FIG. 4, the processes in the flowchart shown in FIG. 10 are executed by the system control unit 226 controlling the various constituent elements.

In step S1004, the viewpoint information processing unit 233 obtains the viewpoint information of a broadcast video from the program information processing unit 216. In step S1006, the viewpoint information processing unit 233 compares the viewpoint information of the broadcast video with the arbitrary viewpoint information, and calculates and obtains a degree of matching B. Then, if it is determined in step S605 that the degree of matching B is greater than or equal to the threshold A, a notification is carried out.

(Variation 2)

In the case where camera video of the viewpoint that is close to the viewpoint of the arbitrary viewpoint video that the user is currently viewing has been detected, the digital broadcast receiving apparatus 100 may output camera video instead of the arbitrary viewpoint video based on an instruction from the user made in response to a notification, or automatically.

For example, assume that the viewpoint of the arbitrary viewpoint video is the icon 801 illustrated in FIG. 8A. In this case, the degree of matching between the viewpoint of the arbitrary viewpoint video (that is, the icon 801) in the viewpoint of the fixed camera 811 is high (that is, greater than or equal to the threshold α), and thus the notification indicated in FIG. 8B indicates that the camera video of the fixed camera 811 can be output (displayed) instead of the arbitrary viewpoint video from that viewpoint (that is, the icon 801). Next, assume that the user who has seen this notification has used the remote controller 201 to instruct the video to be switched to that camera video. In this case, the following processes are carried out under the control of the system control unit 226. First, the fixed camera information processing unit 231 obtains, from the arbitrary viewpoint video generation data server 251, video data corresponding to the viewpoint that has the largest value for the degrees of matching of the multiple fixed cameras 252, and outputs the obtained video data to the display control unit 220. Then, the system control unit 226 controls the display control unit 220 so as to output the video data input from the fixed camera information processing unit 231, instead of the arbitrary viewpoint video data.

In the case where the camera video is a broadcast video, the system control unit 226 controls the tuner unit 210 and the like so as to obtain broadcast video data, instead of obtaining the video data from the fixed cameras 252. Then, the system control unit 226 controls the display control unit 220 so as to output the broadcast video data.

Control such as this may be carried out automatically. In other words, in the case of a situation in which the degree of matching between the viewpoint of the arbitrary viewpoint video and the viewpoint of a fixed camera is high, the system control unit 226 may automatically carry out control for outputting the camera video of that fixed camera, instead of the arbitrary viewpoint video.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application Nos. 2010-152071, filed on Jul. 2, 2010, and 2011-094374, filed on Apr. 20, 2011, which are hereby incorporated by reference herein in their entirety.

What is claimed is:

1. An image processing apparatus comprising:
a first obtainment unit configured to obtain arbitrary viewpoint image data having an arbitrary viewpoint specified by a user, the arbitrary viewpoint image data being generated based on a plurality of image data having different viewpoints;
an output unit configured to output the arbitrary viewpoint image data obtained by the first obtainment unit to a display unit;
a comparison unit configured to compare a degree of matching between a plurality of first viewpoint information corresponding to the plurality of image data having different viewpoints and second viewpoint information corresponding to the arbitrary viewpoint image data with a first threshold and to compare the degree of matching between the plurality of first viewpoint information corresponding to the plurality of image data having different viewpoints and the second viewpoint information corresponding to the arbitrary viewpoint image data with a second threshold smaller than the first threshold, wherein the first and second thresholds are thresholds for determining a level of the degree of matching; and
a notification unit configured to notify the user based on a result of the comparison so that a notification in a case of the degree of matching being greater than or equal to the first threshold is different from a notification in a case of the degree of matching being smaller than the first threshold and greater or equal to the second threshold.

2. The image processing apparatus according to claim 1, further comprising:
a second obtainment unit configured to obtain, as the plurality of first viewpoint information, a plurality of viewpoint information corresponding to the plurality of image data having different viewpoints respectively; and
a determination unit configured to determine the degree of matching between each of the plurality of first viewpoint information and the second viewpoint information,
wherein the comparison unit compares, with the first threshold and the second threshold, the largest value of the degrees of matching between each of the plurality of first viewpoint information and the second viewpoint information; and
the notification unit notifies the user so that a notification in a case of the largest value being greater than or equal to the first threshold is different from a notification in a case of the largest value being smaller than the first threshold and greater or equal to the second threshold.

3. The image processing apparatus according to claim 2, further comprising:
a receiving unit configured to receive image data, among the plurality of image data having different viewpoints, whose degree of matching is the largest value, in the case where the largest value is greater than or equal to the first threshold; and
a control unit configured to control the output unit so as to output the image data whose degree of matching is the largest value to the display unit instead of the arbitrary viewpoint image data, in response to an instruction from the user.

4. The image processing apparatus according to claim 2, wherein the second obtainment unit further obtains, as the first viewpoint information, viewpoint information corresponding to image data contained in a broadcast signal.

5. A control method for an image processing apparatus, the method comprising:
a first obtainment step of obtaining arbitrary viewpoint image data having an arbitrary viewpoint specified by a user, the arbitrary viewpoint image data being generated based on a plurality of image data having different viewpoints;
an output step of outputting the arbitrary viewpoint image data obtained in the first obtainment step to a display unit;
a comparison step of comparing a degree of matching between a plurality of first viewpoint information corresponding to the plurality of image data having different viewpoints and second viewpoint information corresponding to the arbitrary viewpoint image data with a first threshold and to compare the degree of matching between the plurality of first viewpoint information corresponding to the plurality of image data having different viewpoints and the second viewpoint information corresponding to the arbitrary viewpoint image data with a second threshold smaller than the first threshold, wherein the first and second thresholds are thresholds for determining a level of the degree of matching; and
a notification step of notifying the user based on a result of the comparison so that a notification in a case of the degree of matching being greater than or equal to the first threshold is different from a notification in a case of the degree of matching being smaller than the first threshold and greater or equal to the second threshold.

6. The control method according to claim 5, further comprising: a second obtainment step of obtaining, as the plurality of first viewpoint information, a plurality of viewpoint information corresponding to the plurality of image data having different viewpoints respectively; and
a determination step of determining the degree of matching between each of the plurality of first viewpoint information and the second viewpoint information,
wherein the comparison step compares, with the first threshold and the second threshold, the largest value of the degrees of matching between each of the plurality of first viewpoint information and the second viewpoint information; and
the notification step notifies the user so that a notification in a case of the largest value being greater than or equal to the first threshold is different from a notification in a case of the largest value being smaller than the first threshold and greater or equal to the second threshold.

7. The control method according to claim 6, further comprising:
a receiving step of receiving image data, among the plurality of image data having different viewpoints, whose degree of matching is the largest value, in the case where the largest value is greater than or equal to the first threshold; and a control step of controlling the output step so as to output the image data whose degree of matching is the largest value to the display unit instead of the arbitrary viewpoint image data, in response to an instruction from the user.

8. The control method according to claim 6, wherein the second obtainment step further obtains, as the first viewpoint information, viewpoint information corresponding to image data contained in a broadcast signal.

9. The image processing apparatus according to claim 1, wherein the notification unit notifies the user by displaying a notification image on the display unit so that a notification image in a case of the degree of matching being greater than or equal to the first threshold is different from a notification image in a case of the degree of matching being smaller than the first threshold and greater or equal to the second threshold.

10. The image processing apparatus according to claim 1, wherein the notification unit notifies the user by displaying a sub screen on the display unit so that a sub screen in a case of the degree of matching being greater than or equal to the first threshold is different from a sub screen in a case of the degree of matching being smaller than the first threshold and greater or equal to the second threshold.

11. The control method according to claim 5, wherein the notification step notifies the user by displaying a notification image on the display unit so that a notification image in a case of the degree of matching being greater than or equal to the first threshold is different from a notification image in a case of the degree of matching being smaller than the first threshold and greater or equal to the second threshold.

12. The control method according to claim 5, wherein the notification step notifies the user by displaying a notification image on the display unit so that a notification image in a case of the degree of matching being greater than or equal to the first threshold is different from a notification image in a case of the degree of matching being smaller than the first threshold and greater or equal to the second threshold.

* * * * *